A. T. NOE.
PNEUMATIC RENOVATING MACHINE.
APPLICATION FILED FEB. 23, 1909.
1,096,743.
Patented May 12, 1914.
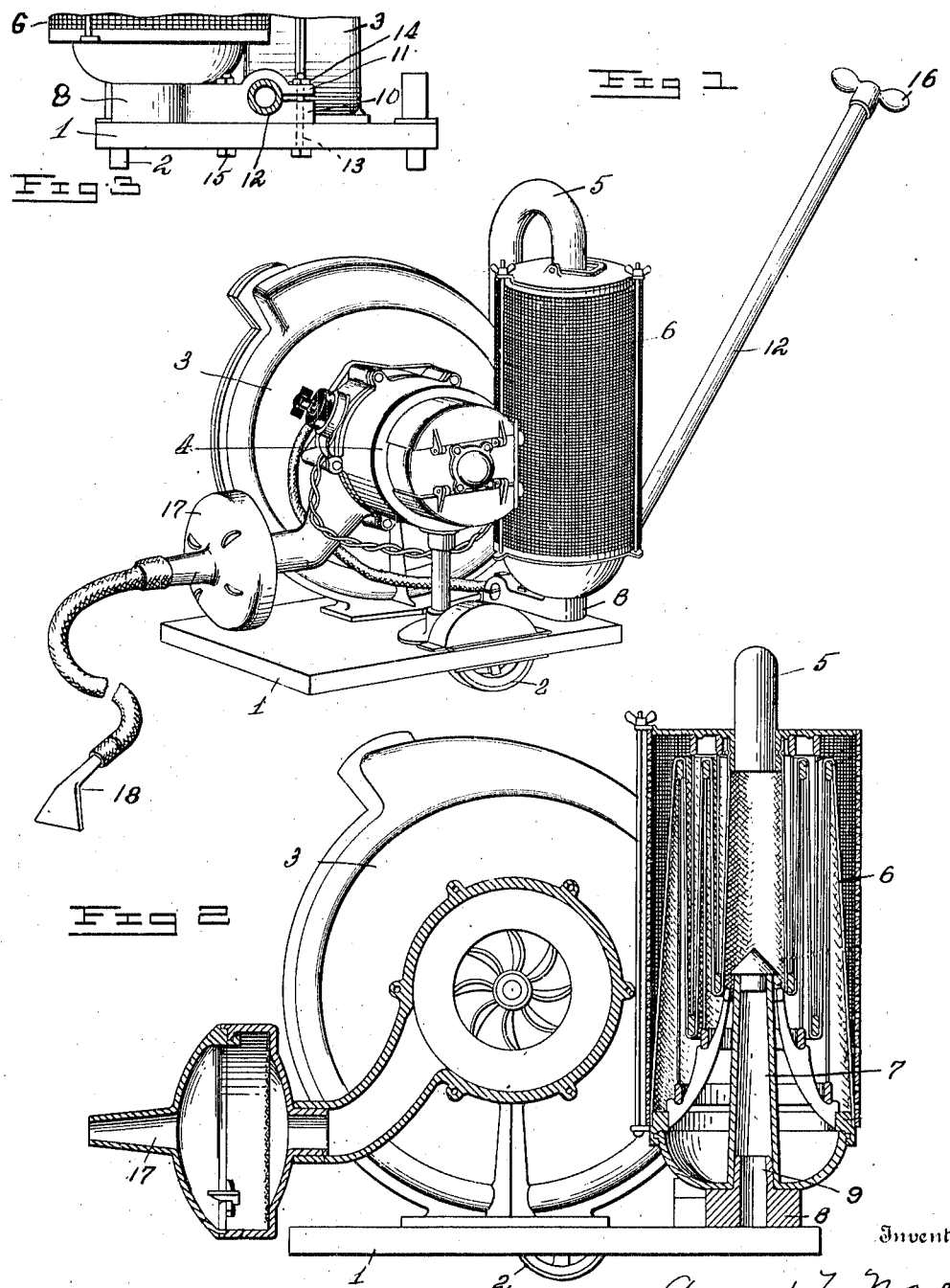

UNITED STATES PATENT OFFICE.

AMON T. NOÉ, OF NEW YORK, N. Y., ASSIGNOR TO ELECTRIC RENOVATOR MANUFACTURING CO., OF PITTSBURGH, PENNSYLVANIA, A CORPORATION OF PENNSYLVANIA.

PNEUMATIC RENOVATING-MACHINE.

1,096,743.   Specification of Letters Patent.   Patented May 12, 1914.

Application filed February 23, 1909. Serial No. 479,641.

*To all whom it may concern:*

Be it known that I, AMON T. NOÉ, a citizen of the United States, residing at New York city, in the county of New York and State of New York, have invented new and useful Improvements in Pneumatic Renovating-Machines, of which the following is a specification.

This invention relates to certain new and useful improvements in pneumatic renovating machines, or what are commonly known as suction cleaning apparatus, and has to do more particularly with a novel arrangement of the parts of the apparatus and means for assembling certain of those parts upon a base or the like.

The object of this invention is to provide a novel construction and arrangement of means for removably and replaceably supporting the dust collector in coöperative relation with the other necessary parts of a suction cleaning device so that said collector may be readily removed for the purpose of emptying therefrom the collected dust, the said dust collector supporting means having associated therewith suitable jaws for receiving and holding a propelling handle for the apparatus.

This invention is illustrated and described in connection with apparatus of the type shown in my prior Letters Patent, Nos. 918,894, 918,896 and 918,897 dated April 20, 1909, as an understanding of the object of the present invention will best be obtained by this showing, but it is to be understood that the improvements of this invention may be associated with any apparatus of other types without departing from the spirit of the invention.

In the accompanying drawing disclosing the present embodiment of the invention, Figure 1 is a perspective view of a pneumatic renovating machine assembled by the device of this invention. Fig. 2 is a longitudinal sectional view taken vertically through the same. Fig. 3 is a detail view of the lower part of the apparatus showing the clamping plate, the handle being shown in section.

Referring to the drawing, the reference numeral 1 designates a platform or base mounted upon wheels 2, the platform carrying the suction cleaning means in the present instance shown as a fan 3 driven by a motor 4 suitably connected to the fan 3. The fan 3 is connected by a pipe 5 to the upper end of a dust collector 6 having in its lower end a vertical opening 7 disposed centrally therein. Carried upon the platform or base 1 is a plate 8 provided near one end with an upstanding stud 9 fitting into said vertical opening 7 in the bottom of the dust collector. The stud 9 is adapted to fit snugly in the opening 7 and to thereby hold by friction, the dust collector in upright position upon the platform 1. It may be also noted that the dust collector can be readily lifted from the stud 9 when it is desired to empty the collected dust from the collector. This plate 8, as may be best seen from Fig. 3, extends across the top of the platform 1 near one end and is provided with a pair of clamping jaws 10 and 11 having concaved inner faces forming a cylindrical socket for the reception of the inner end of a handle 12. The jaws 10 and 11 are spaced apart slightly at their outer ends and are adapted to be drawn together to bind upon the handle 12 by a bolt 13 with a nut 14 upon its threaded end which passes preferably up through the platform 1 and the jaws 10 and 11, the nut 14 being positioned against the upper side of the jaw 11. The bolt 13 thus not only clamps the jaws upon the handle 12, but also serves to secure one end of the plate 8 to the platform. A second bolt 15 is employed which passes up through the platform and through the plate 8 near its opposite end. The handle 12 may be of any approved type and is shown in the present instance as having a cross-bar 16 upon its upper end constituting hand-holds by means of which the operator may move the machine from place to place. Connected to the fan 3 is any suitable means 17 for connecting the cleaning tool 18 to the fan.

It is of course understood that the structure above set forth may be departed from to a considerable extent within the limit of the appended claim.

What I cliam is:

In a device as specified, a portable base, a handle for moving the base, a suction cleaning device mounted on the base, a dust collector located on the base having connection with said cleaning device, and means for securing the dust collector and the handle to the base, said means comprising a plate having an upstanding stud engaging the dust receptacle and a pair of clamping jaws engaging the handle, and fastening means passing down through the clamping jaws and the base for contracting said jaws to secure the plate and the handle to the base.

In testimony whereof I have hereunto set my hand in presence of two subscribing witnesses.

AMON T. NOÉ.

Witnesses:
ERNEST E. L. HAMMER,
ANNA A. PARKER.